US010620922B2

(12) United States Patent
Jayaswal et al.

(10) Patent No.: US 10,620,922 B2
(45) Date of Patent: Apr. 14, 2020

(54) COMPILER PLATFORM FOR TEST METHOD

(71) Applicant: Microsoft Technology Licensing, LLC, Redmond, WA (US)

(72) Inventors: Manish Kumar Jayaswal, Redmond, WA (US); Ghanashyam Chandrasekhar Namboodiripad, Issaquah, WA (US); Artur Zbigniew Spychaj, Bellevue, WA (US); En-Shuo Hsu, Redmond, WA (US); Peter Bern Waldschmidt, Greenville, SC (US); Kevin Wagner Halverson, Kirkland, WA (US); John Austin Fleisher, Taylors, SC (US); Gen Lu, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 40 days.

(21) Appl. No.: 15/970,692

(22) Filed: May 3, 2018

(65) Prior Publication Data
US 2019/0339951 A1 Nov. 7, 2019

(51) Int. Cl.
*G06F 8/41* (2018.01)
*G06F 8/73* (2018.01)
(Continued)

(52) U.S. Cl.
CPC ............ *G06F 8/42* (2013.01); *G06F 8/41* (2013.01); *G06F 8/73* (2013.01); *G06F 9/448* (2018.02); *G06F 9/451* (2018.02)

(58) Field of Classification Search
CPC ..... G06F 8/41; G06F 8/42; G06F 8/73; G06F 9/448; G06F 9/451
(Continued)

(56) References Cited

U.S. PATENT DOCUMENTS

2004/0123186 A1\* 6/2004 Kulp .................. G06F 8/38
714/38.1
2004/0133883 A1\* 7/2004 Sato .................. G06F 21/125
717/136
(Continued)

OTHER PUBLICATIONS

Augustin, "C++ Unit Testing in Visual Studio," <https://devblogs.microsoft.com/cppblog/cpp-testing-in-visual-studio/>, Apr. 19, 2017, p. 1-7. (Year: 2017).\*
(Continued)

*Primary Examiner* — Qing Chen
(74) *Attorney, Agent, or Firm* — Alleman Hall Creasman & Tuttle LLP (57) ABSTRACT

A computing device is provided, including a display and a processor. The processor may be configured to execute a source code authoring application program. The processor may be further configured to output a graphical user interface (GUI) of the source code authoring application program for display on the display. The processor may be further configured to receive source code including one or more code instructions at an editor window included in the GUI. The editor window may provide real-time mark-up of the source code. At a compiler platform, the processor may be further configured to determine that the source code includes at least one test method based on at least one syntactic test method indicator or symbolic test method indicator included in the source code. The processor may be further configured to output a notification of the at least one test method for display on the display.

20 Claims, 8 Drawing Sheets (51) Int. Cl.
*G06F 9/448* (2018.01)
*G06F 9/451* (2018.01)

(58) Field of Classification Search
USPC .................................................. 717/140–161
See application file for complete search history.

(56) References Cited

U.S. PATENT DOCUMENTS

| | | | | |
|---|---|---|---|---|
| 2004/0210874 A1* | 10/2004 | Kageyama | .......... | G06F 11/3684 717/124 |
| 2005/0114837 A1* | 5/2005 | Blumenthal | ........ | G06F 11/3688 717/124 |
| 2013/0152043 A1* | 6/2013 | Kuzmin | .................... | G06F 8/72 717/110 |

OTHER PUBLICATIONS

"Unit testing C# with MSTest and .NET Core," <https://docs.microsoft.com/en-us/dotnet/core/testing/unit-testing-with-mstest>, Sep. 7, 2017, p. 1-6. (Year: 2017).*

"Use the Microsoft Unit Testing Framework for C++ in Visual Studio," <https://docs.microsoft.com/en-us/visualstudio/test/how-to-use-microsoft-test-framework-for-cpp?view=vs-2019>, Nov. 14, 2017, p. 1-4. (Year: 2017).*

* cited by examiner

COMPILER PLATFORM FOR TEST METHOD

BACKGROUND

Code may include test methods that allow the functionality of features of the code to be tested during development. In existing code authoring systems, test methods are typically identified by building the code using a compiler and searching compiled assemblies for indicators of test methods. However, it will be appreciated that building the code may be computationally expensive, taking significant time to compile the source code into the assemblies and then run test discovery tools on the compiled assemblies. Thus, developers may become frustrated with such a time-consuming test discovery process using existing code authoring systems, particularly when the code is required to be built repeatedly over the course of code development as test methods are added and/or removed from the code.

SUMMARY

According to one aspect of the present disclosure, a computing device is provided, including a display and a processor. The processor may be configured to execute a source code authoring application program. The processor may be further configured to output a graphical user interface (GUI) of the source code authoring application program for display on the display. The processor may be further configured to receive source code including one or more code instructions at an editor window included in the GUI. The editor window may be configured to provide real-time mark-up of the source code. At a compiler platform, the processor may be further configured to determine that the source code includes at least one test method based on at least one syntactic test method indicator or symbolic test method indicator included in the source code. The processor may be further configured to output a notification of the at least one test method for display on the display.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
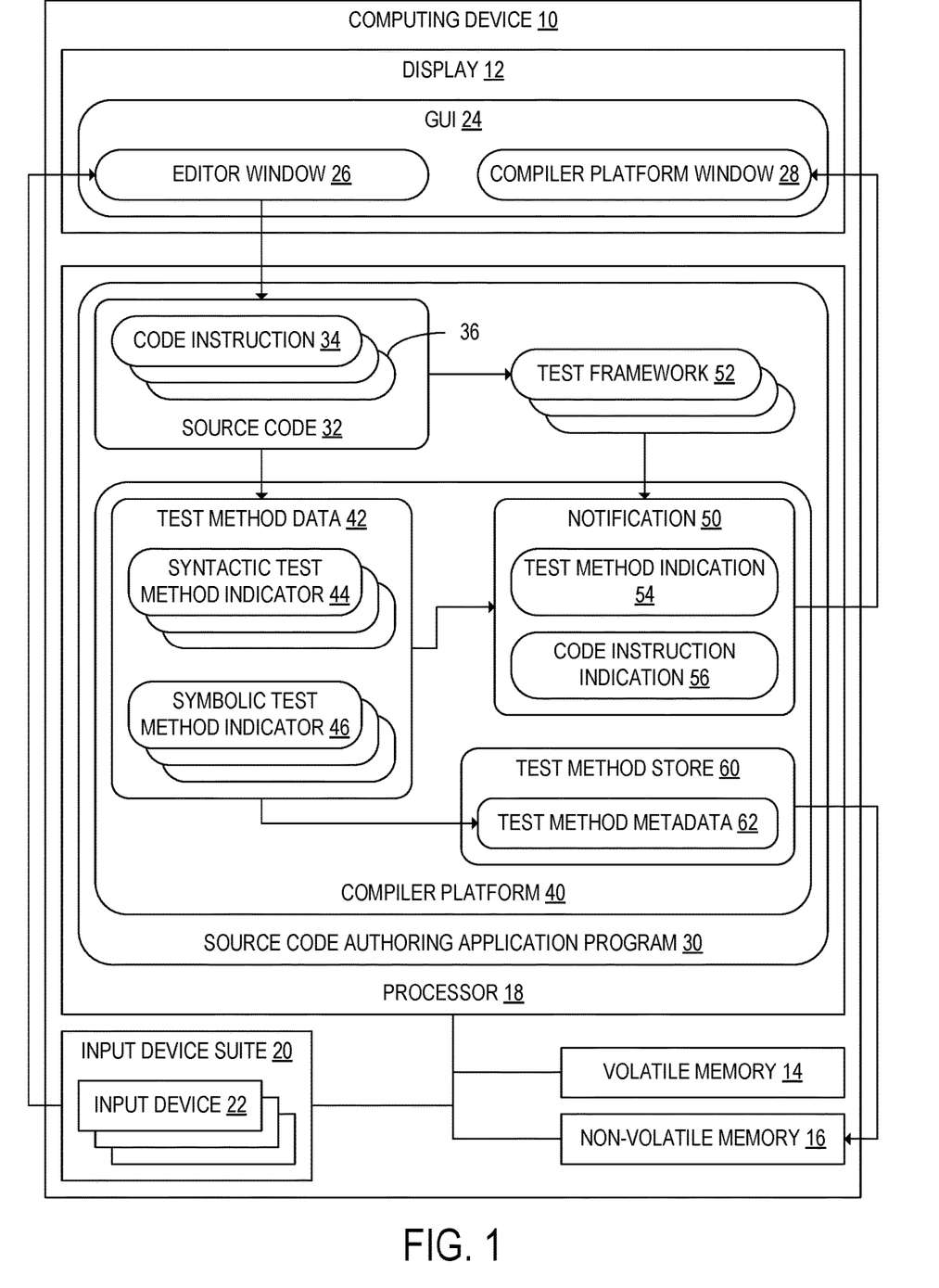
FIG. 1 shows an example computing device including a processor configured to execute a source code authoring application program, according to one embodiment of the present disclosure.

In order to address the challenges discussed above, a computing device 10 is provided, as shown in the example embodiment of FIG. 1. The computing device 10 may include a display 12, volatile memory 14, non-volatile memory 16, a processor 18, and/or an input device suite 20 including one or more input devices 22. The one or more input devices 22 may include, for example, one or more of a keyboard, a mouse, a trackpad, a touchscreen, a microphone, a camera, an inertial motion unit, a global positioning system (GPS) unit, and/or some other input device 22. In addition to the display 12, the computing device 10 may further include one or more other output devices, such as a speaker, a haptic feedback unit, or some other output device.

The processor 18 may be configured to execute a source code authoring application program 30. The source code authoring application program 30 may output a graphical user interface (GUI) 24 for display on the display 12. In some embodiments, the source code authoring application program 30 may additionally convey output to one or more of the other output devices included in the computing device 10. For example, the source code authoring application program 30 may convey a sound output to a speaker.

The GUI 24 of the source code authoring application program 30 may include one or more graphical elements with which a user may interact via the one or more input devices 22. The one or more graphical elements included in the GUI may include an editor window 26. At the editor window 26, the processor 18 may be further configured to receive source code 32 including one or more code instructions 34. The editor window 26 may provide real-time mark-up of the source code 32 as the source code 32 is written and edited by the user, which may be displayed in the editor window 26. Real-time markup may allow the user to more easily identify properties of the code, such as syntactical structure or potential errors, prior to building the source code 32.

The processor 18 may be further configured to execute a compiler platform 40, which may be configured to compile and/or perform code analysis on the source code 32. The compiler platform 40 may be, for example, the MICROSOFT.NET Compiler Platform ("Roslyn"). In some embodiments, the compiler platform may be included in the source code authoring application program 30. In such embodiments, the GUI 24 of the source code authoring application program 30 may include a compiler platform window 28.

At the compiler platform 40, the processor 18 may be further configured to determine that the source code includes at least one test method 36. The processor 18 may make this determination based on test method data 42 that may include at least one syntactic test method indicator 44 or symbolic test method indicator 46 included in the source code 32. The at least one syntactic test method indicator 44 may be a property of the syntactic structure of the source code 32 that is associated with a test method 36. In one example, for each code instruction 34 included in the source code 32 the processor 18 may determine an estimated probability that a test method 36 occurs at that code instruction 34 based on the syntactic structure of the code instruction 34 and/or one or more other code instructions 34 in proximity to the code instruction 34. The at least one symbolic test method indicator 46 may be one or more symbols that are associated with a test method. "Symbol" refers here to an element declared in the source code 32 or included in metadata associated with the source code 32. For example, a symbol may be a namespace, type, property, field, event, parameter, or local variable.

In some embodiments, the processor 18 may be further configured to maintain a test method store 60 in the non-volatile memory 16. The test method store 60 may include respective test method metadata 62 associated with the at least one test method 36. For example, the test method metadata 62 may include a timestamp for the time at which the test method 36 is added to the source code 32. Additionally or alternatively, the test method metadata 62 may indicate a type of the test method 36. When the test method 36 is performed after the source code 32 is built, the processor 18 may store test method metadata 62 indicating, for example, a number of times the test method 36 has been performed and a respective timestamp of each of those times.

In some embodiments, the source code authoring application program 30 may support a plurality of test frameworks 52. Each test framework 52 may indicate at least one syntactic test method indicator 44 and/or at least one symbolic test method indicator 46 that the processor 18 may be configured to search for in the source code 32 when that test framework 52 is used. When at least one syntactic test method indicator 44 or symbolic test method indicator 46 is detected at the compiler platform 40, the processor 18 may be further configured to determine that the at least one syntactic test method indicator 44 or symbolic test method indicator 46 is included in a test framework 52 of a plurality of test frameworks 52. This determination may be made, for example, by determining that the at least one syntactic test method indicator 44 or symbolic test method indicator 46 is associated with a particular test method framework 52. For example, the at least one syntactic test method indicator 44 or symbolic test method indicator 46 may be included in only one test framework 52.

Three example test methods frameworks 52 are MSTest, NUnit, and XUnit. MSTest is a test method framework 52 within MICROSOFT VISUAL STUDIO, NUnit is an open source unit testing framework for MICROSOFT.NET, and XUnit is another open source testing framework for MICROSOFT.NET. In the MSTest framework, attributes that define a test method 36 may include the following:
Microsoft.VisualStudio.TestTools.UnitTesting.TestClassAttribute
Microsoft.VisualStudio.TestTools.UnitTesting.TestMethodAttribute
Microsoft.VisualStudio.TestTools.UnitTesting.TestClassExtensionAttribute
This testing framework allows users to organize tests by traits, such as test category, test property, priority and owner. Attributes that may define traits may include the following:
Microsoft.VisualStudio.TestTools.UnitTesting.TestPropertyAttribute
Microsoft.VisualStudio.TestTools.UnitTesting.DescriptionAttribute
Microsoft.VisualStudio.TestTools.UnitTesting.CssProjectStructureAttribute
Microsoft.VisualStudio.TestTools.UnitTesting.CssIterationAttribute
Microsoft.VisualStudio.TestTools.UnitTesting.WorkItemAttribute
Microsoft.VisualStudio.TestTools.UnitTesting.OwnerAttribute
Microsoft.VisualStudio.TestTools.UnitTesting.PriorityAttribute
Microsoft.VisualStudio.TestTools.UnitTesting.TestCategoryAttribute In the NUnit framework, attributes that define a test method 36 may include the following:
NUnit.Framework.TestFixtureAttribute
NUnit.Framework.TestAttribute
NUnit.Framework.TestFixtureSourceAttribute
NUnit.Framework.TestCaseAttribute
NUnit.Framework.TestCaseSourceAttribute
NUnit.Framework.TheoryAttribute
Attributes that define traits may include the following:
NUnit.Framework.CategoryAttribute
NUnit.Framework.ApartmentAttribute
NUnit.Framework.AuthorAttribute
NUnit.Framework.DescriptionAttribute
NUnit.Framework.LevelOfParallelismAttribute
NUnit.Framework.MaxTimeAttribute
NUnit.Framework.RepeatAttribute
NUnit.Framework.ParallelizableAttribute
NUnit.Framework.NonParallelizableAttribute
NUnit.Framework.RequiresThreadAttribute
NUnit.Framework.RetryAttribute
NUnit.Framework.SetCultureAttribute
NUnit.Framework.SetUICultureAttribute
NUnit.Framework.TestOfAttribute
NUnit.Framework.TimeoutAttribute
NUnit.Framework.PropertyAttribute
NUnit.Framework.ParallelScope In the XUnit framework, attributes that define a test method 36 may include the following:
Xunit.FactAttribute
Xunit.TestFrameworkAttribute
Xunit.TheoryAttribute
Xunit.Extensions.TheoryAttribute
Xunit.Sdk.DataAttribute
Xunit.Extensions.DataAttribute
Xunit.InlineDataAttribute
Xunit.Extensions.InlineDataAttribute
Attributes that define traits may include the following:
Xunit.TraitAttribute
Xunit.AssemblyTraitAttribute It will be appreciated that the above examples are specific to the MSTest, NUnit, and XUnit testing frameworks, and that other test attributes and traits may be used to define test methods 36 in other test method frameworks 52.

The processor 18 may be further configured to output a notification 50 of the at least one test method 36 for display on the display 12. In embodiments in which the GUI 24 of the source code authoring application program 30 includes a compiler platform window 28, the notification 50 may be output for display in the compiler platform window 28. In other embodiments, the notification 50 may be output for display in the editor window 26.

In embodiments in which the processor 18 is configured to search for a plurality of syntactic test method indicators 44 and/or symbolic test method indicators 46, the notification 50 may include a test method indication 54 that shows what test method(s) 36 are determined by the processor 18 to be included in the source code 32. When the processor 18 determines that the source code 32 includes a plurality of syntactic test method indicators 44 and/or symbolic test method indicators 46, the notification 50 may include a test method indication 54 for each syntactic test method indicator 44 and/or symbolic test method indicator 46 determined to be included in the source code 32.

In some embodiments, the notification 50 may include a code instruction indication 56 that indicates at least one code instruction 34 of the one or more code instructions 34 at which the at least one test method 36 occurs in the source code 32. For example, in embodiments in which the notification 50 is displayed in the editor window 26, the notification 50 may be displayed alongside lines of the source code 32 that include the test method 36.

In embodiments in which the processor 18 is configured to identify a test framework 52, the processor 18 may be further configured to output the notification 50 of the at least one test method 36 based at least in part on the test framework 52. For example, the notification 50 may indicate the test framework 52 associated with the at least one test method 36.

Figure 2:
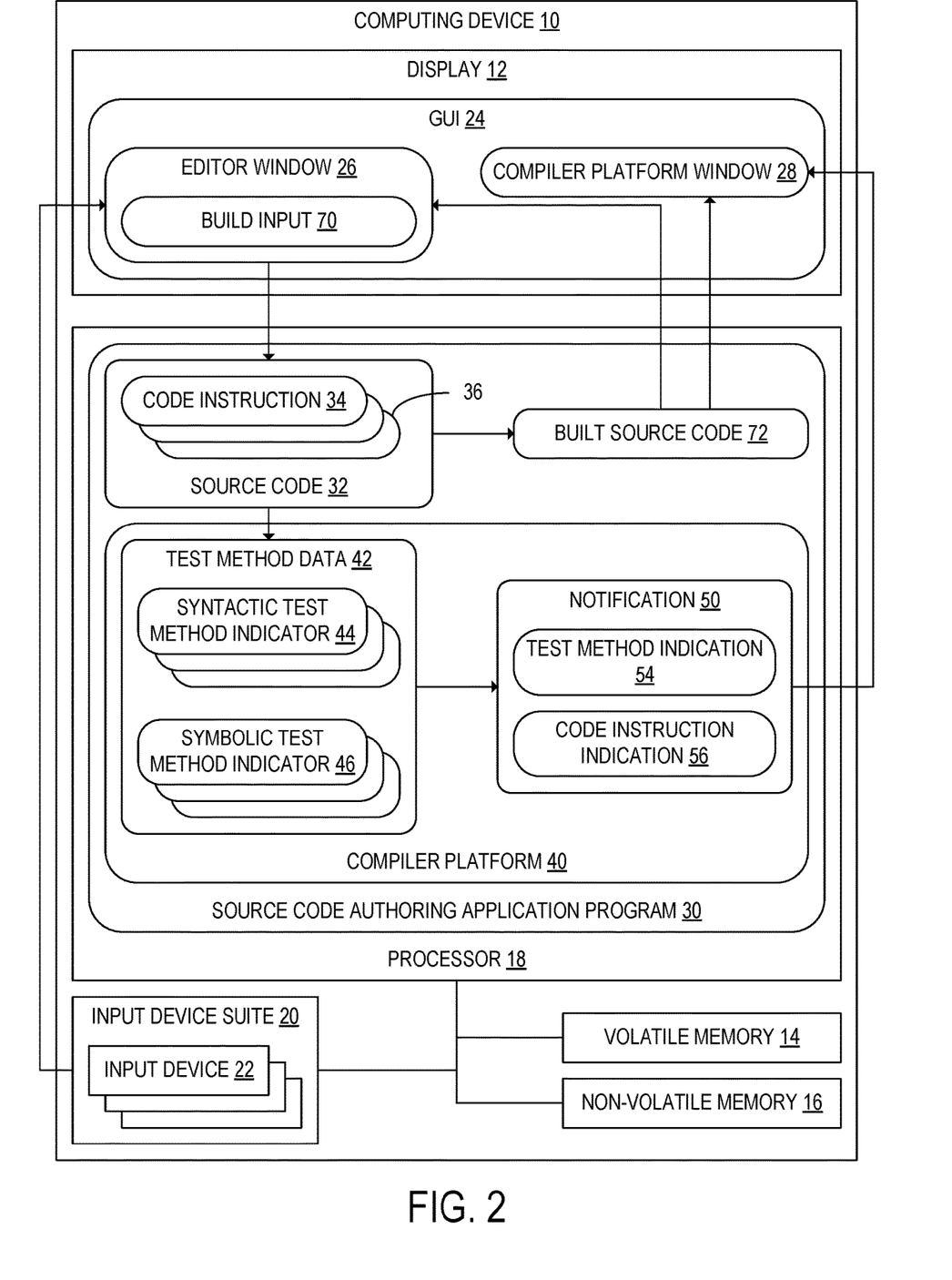
FIG. 2 shows the example computing device of FIG. 1, wherein the processor is further configured to receive a build input.

In some embodiments, as shown with reference to FIG. 2, the processor 18 may be further configured to receive a build input 70 at the GUI 24. The build input 70 may be received at the editor window 26 in some embodiments, as shown in FIG. 2. Alternatively, the build input 70 may be received at the compiler platform window 28. In response to receiving the build input 70, the processor 18 may be further configured to build the source code 32 to produce built source code 72. The built source code 72 may be assembly code. The processor 18 may build the source code 32 by compiling the source code 32 at a compiler associated with the compiler platform window 28. In some embodiments, the built source code 72 may be displayed in the compiler platform window 28. Alternatively, the built source code 72 may be displayed in the editor window 26.

The notification 50 may be output prior to building the source code 32. Thus, real-time markup of the source code 32 indicating the at least one test method 36 may be displayed without requiring the source code 32 to be built. Since building the source code 32 may be a computationally intensive process, notifying a user of the at least one test method 36 may result in significant time savings over prior methods that performed test discovery on compiled assemblies, as explained in more detail below.

Figure 3:
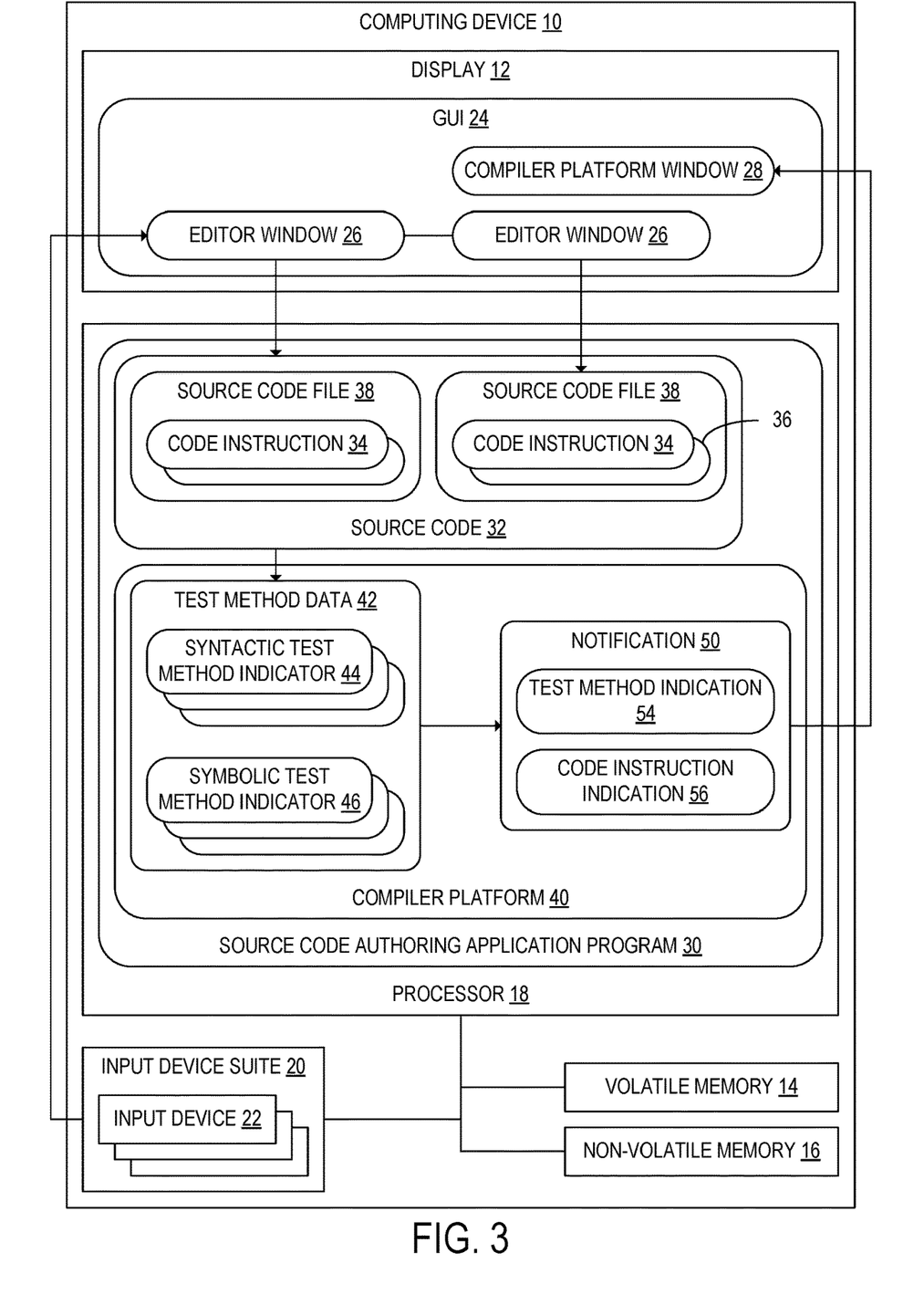
FIG. 3 shows the example computing device of FIG. 1, wherein the source code includes a plurality of source code files.

In some embodiments, as shown with reference to FIG. 3, the source code 32 may include a plurality of source code files 38. Each of the source code files 38 may include one or more code instructions 34. In some embodiments, the GUI 24 of the source code authoring application program 30 may include a plurality of editor windows 26. In such embodiments, each editor window 26 of the plurality of editor windows 26 may display a respective source code file 38. In other embodiments, the plurality of source code files 38 may be displayed in a single editor window. When a user edits a source code file 38 of the plurality of source code files 38, the user may desire to check a subset of the source code files 38 for the at least one syntactic test method indicator 44 and/or symbolic test method indicator 46 without checking every source code file 38. Thus, the processor 18 may be configured to determine that a source code file 38 of the plurality of source code files 38 includes the at least one test method 36. The processor 18 may check the source code file 38 for the at least one test method 36 without checking the other source code file(s) 38.

Figure 4:
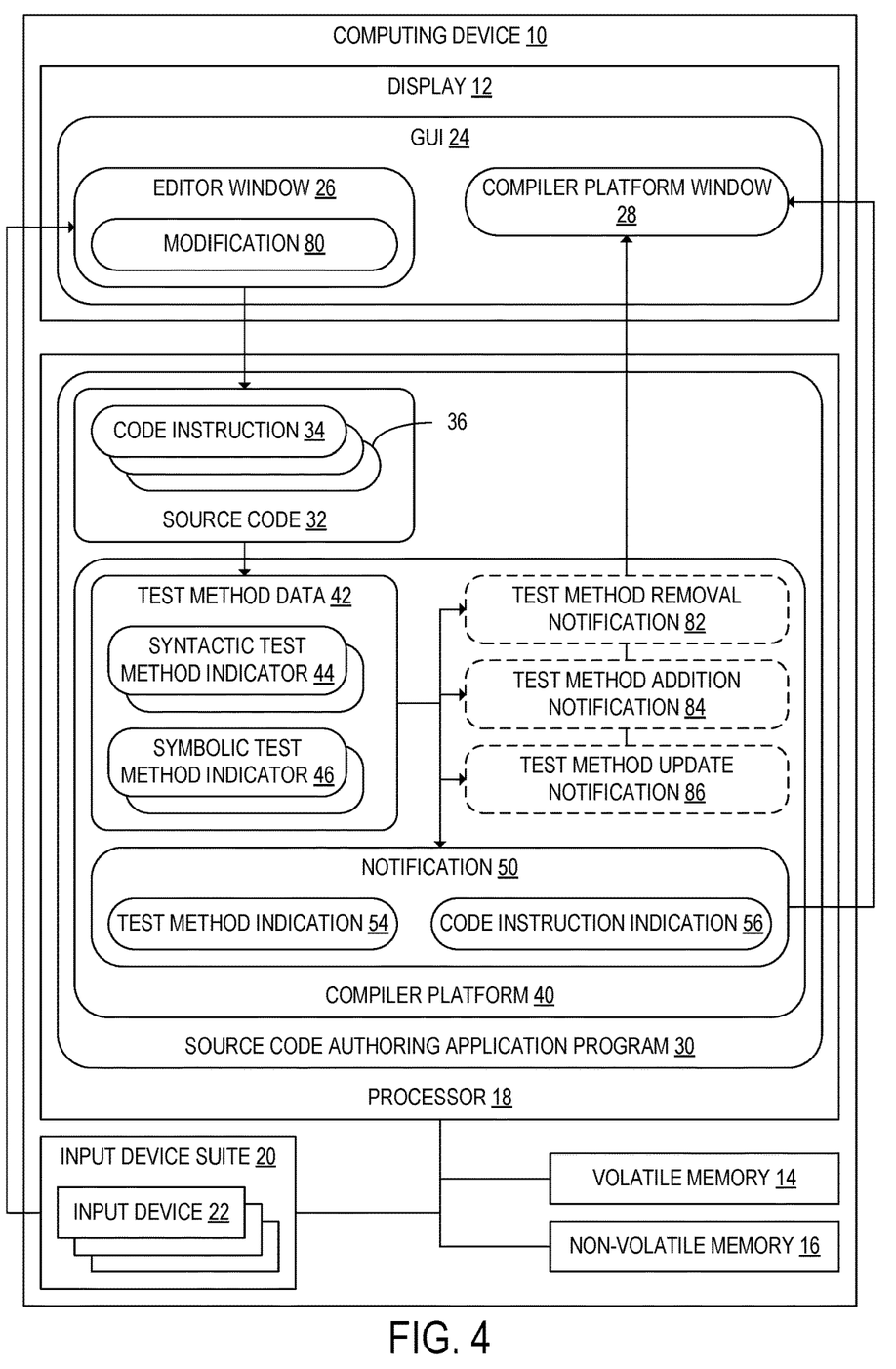
FIG. 4 shows the example computing device of FIG. 1, wherein the processor is further configured to receive a source code modification.

In some embodiments, as shown with reference to FIG. 4, the processor 18 may be further configured to receive a modification 80 to the source code 32 at the editor window 26. The modification 80 may add and/or remove one or more code instructions 34 to and/or from the source code 32. The one or more code instructions 34 added to and/or removed from the source code 32 may include at least one test method 36. The processor 18 may be further configured to determine that the modification 80 to the source code 32 removes the at least one test method 36 from the source code 32. In such embodiments, the processor 18 may be further configured to output a test method removal notification 82 for display on the display 12. The test method removal notification 82 may be displayed in the compiler platform window 28. The test method removal notification 82 may indicate at least one code instruction 34 at which the removed test method 36 occurred and may further indicate the syntactic test method indicator 44 and/or symbolic test method indicator 46 that indicated the removed test method 36.

In some embodiments, the processor 18 may additionally or alternatively determine that the modification 80 to the source code 32 adds at least one additional test method 36 to the source code 32. In such embodiments, the processor 18 may be further configured to output a test method addition notification 84 for display on the display 12. The test method addition notification 84 may be displayed in the compiler platform window 28. The test method addition notification 84 may indicate at least one code instruction 34 at which the additional test method 36 occurs and may further indicate the syntactic test method indicator 44 and/or symbolic test method indicator 46 that indicates the additional test method 36.

In some embodiments, the processor 18 may additionally or alternatively determine that the modification 80 to the source code 32 modifies at least one preexisting test method 36 that occurs in the source code 32. In such embodiments, the processor 18 may be further configured to output a test method update notification 86 for display on the display 12. The test method update notification 86 may be displayed in the compiler platform window 28. The test method update notification 86 may indicate at least one code instruction 34 at which the preexisting test method 36 occurs and may further indicate the syntactic test method indicator 44 and/or symbolic test method indicator 46 that indicates the preexisting test method 36. The test method update notification 86 may additionally or alternatively indicate the change made to the preexisting test method 36 by the modification 80.

Figure 5:
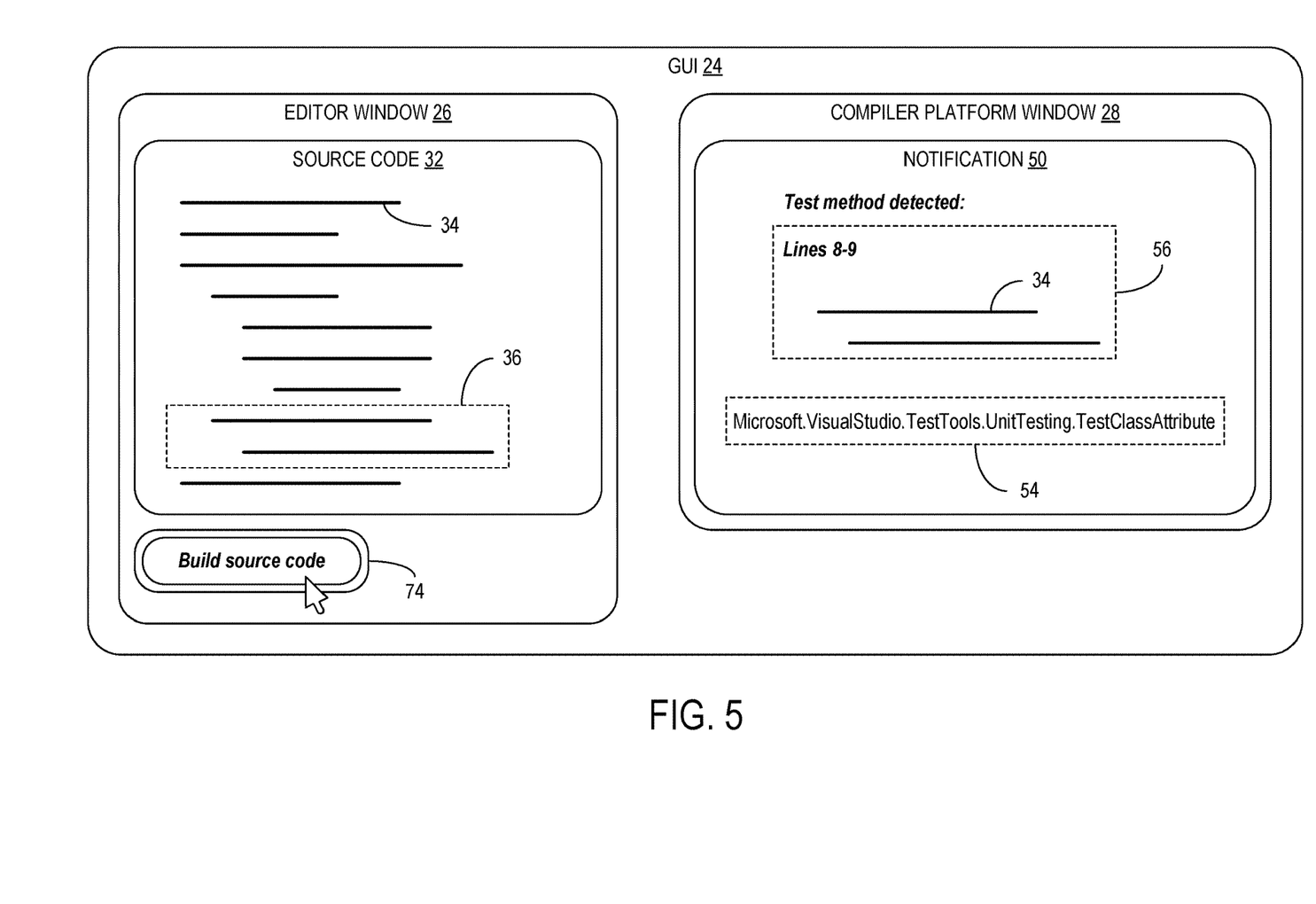
FIG. 5 shows an example GUI of the source code authoring application program, according to the embodiment of FIG. 1.

FIG. 5 shows an example GUI 24 of the source code authoring application program 30. The GUI 24 shown in FIG. 5 includes an editor window 26 in which source code 32 is displayed. The source code 32 includes a plurality of code instructions 34. A test method 36 included in the example source code 32 of FIG. 5 includes two code instructions 34. The editor window 26 further includes a build interactable element 74 labeled "Build source code." Upon selection of the build interactable element 74 via an input device 22, the processor 18 may build the source code 32.

The example GUI of FIG. 5 further includes a compiler platform window 28. A notification 50 of the test method 36 is shown in the compiler platform window 28. The notification 50 includes the code instructions 34 of the source code 32 at which the test method 36 occurs. The notification further includes a code instruction indication 56 that indicates that the test method 36 occurs at lines 8-9 of the source code 32. The code instruction indication 56 further includes the code instructions 34 included in the test method 36. The notification 50 further includes a test method indication 54, which indicates that the test method 36 determined to be included in the source code 32 is Microsoft.VisualStudio.TestTools.UnitTesting.TestClassAttribute.

Figure 6:
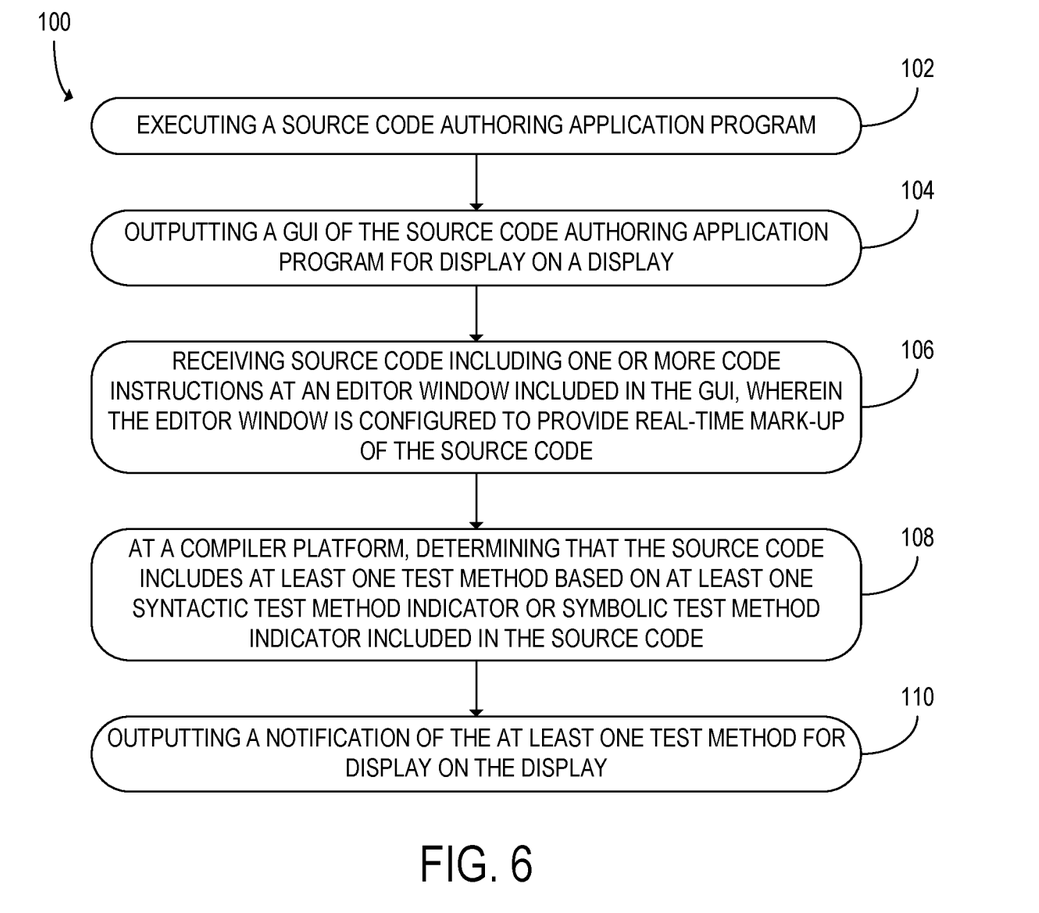
FIG. 6 shows a flowchart of a method for use with a computing device, according to the embodiment of FIG. 1.

FIG. 6 shows a flowchart of an example method 100 for use with a computing device, which may be the computing device of FIG. 1. At step 102, the method 100 may include executing a source code authoring application program. The source code authoring application program may be executed at a processor of the computing device. At step 104, the method 100 may further include outputting a GUI of the source code authoring application program for display on a display. Outputs of the source code authoring application program may additionally be output to one or more other output devices, such as a speaker. At step 106, the method 100 may further include receiving source code including one or more code instructions at an editor window included in the GUI. The editor window may be configured to provide real-time mark-up of the source code. In some embodiments, the source code may include a plurality of source code files.

At step 108, the method 100 may further include, at a compiler platform, determining that the source code includes at least one test method based on at least one syntactic test method indicator or symbolic test method indicator included in the source code. In some embodiments, the compiler platform may be included in the source code authoring application program. In such embodiments, the GUI of the source code authoring application program may include a compiler platform window associated with the compiler platform. In embodiments in which the source code includes a plurality of source code files, the method 100 may include determining that a source code file of the plurality of source code files includes the at least one test method.

At step 110, the method 100 may further include outputting a notification of the at least one test method for display on the display. In embodiments in which the GUI includes a compiler platform window, the notification of the at least one test method may be displayed in the compiler platform window. In some embodiments, the notification of the at least one test method may indicate at least one code instruction of the one or more code instructions at which the at least one test method occurs in the source code. In some embodiments, the method 100 may further include maintaining a test method store including respective test method metadata associated with the at least one test method. The test method store may allow the test method metadata to be stored across source code editing sessions and may allow the test method metadata to be used by one or more other application programs.

Figure 7:
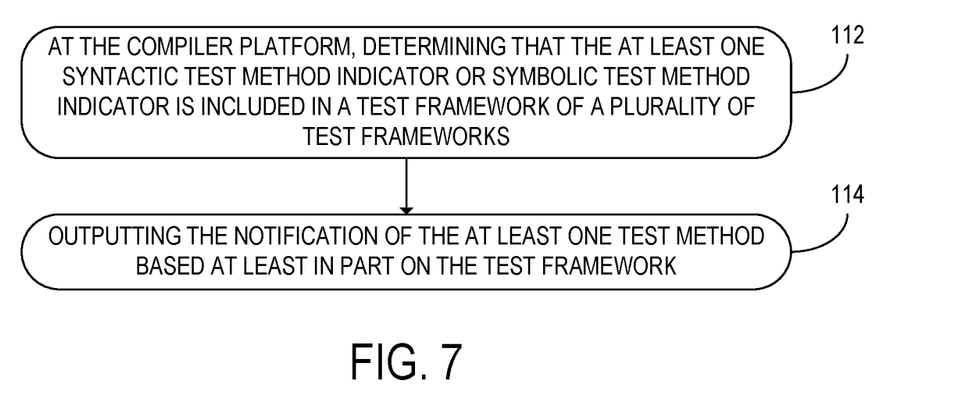
FIGS. 7-9 show additional steps of the method of FIG. 6 that may be performed in some embodiments.
Figure 8:
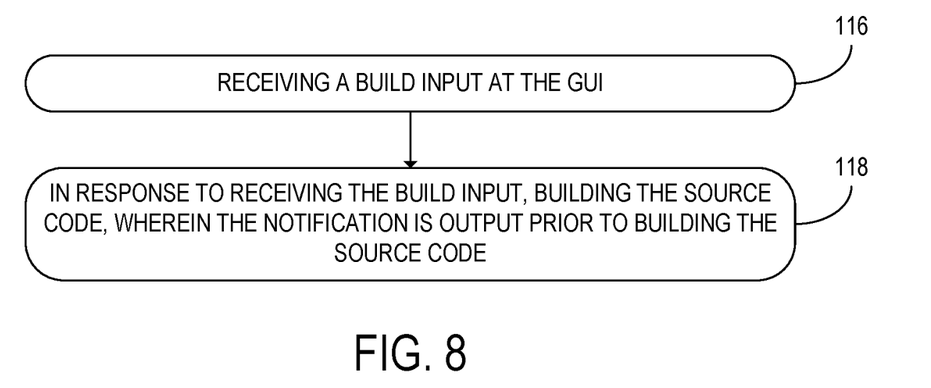
Figure 9:
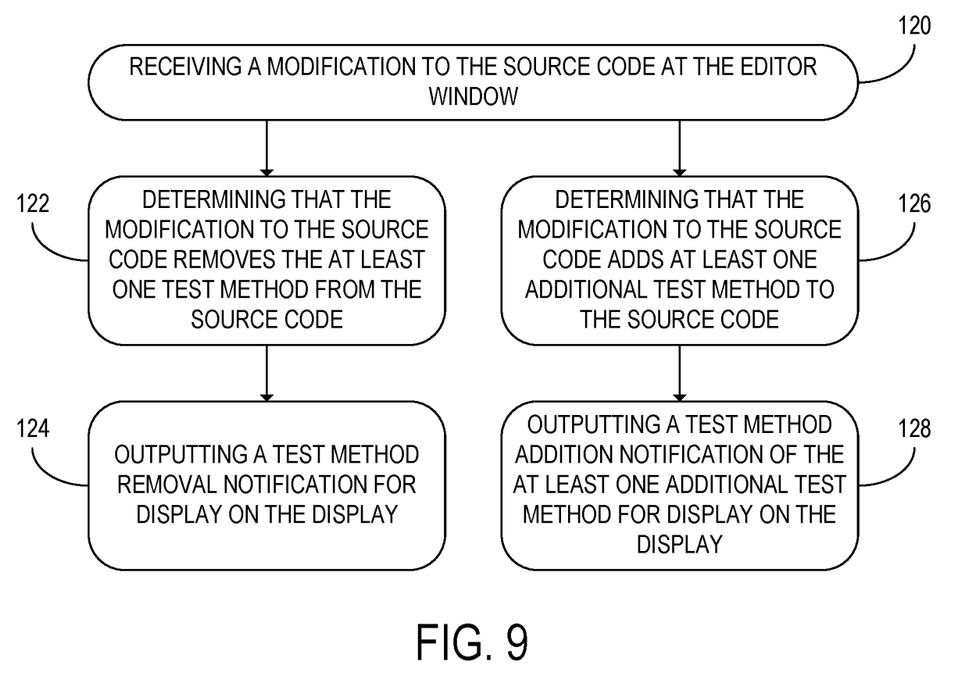

FIGS. 7-9 show additional steps that may be performed when performing the method 100 in some embodiments. FIG. 7 shows additional steps of the method 100 related to test frameworks. At step 112, the method 100 may further include, at the compiler platform, determining that the at least one syntactic test method indicator or symbolic test method indicator is included in a test framework of a plurality of test frameworks. The test framework may indicate one or more test methods and respective syntactic test method indicator(s) and/or symbolic test method indicator(s) of the one or more test methods. The test framework may be determined based on the at least one syntactic test method indicator and/or symbolic test method indicator, for example, by identifying a syntactic test method indicator or symbolic test method indicator that is included in a test framework but not in other test frameworks. The method 100 may further include, at step 114, outputting the notification of the at least one test method based at least in part on the test framework.

FIG. 8 shows additional steps of the method 100 related to building the source code. At step 116, the method 100 may further include receiving a build input at the GUI. At step 118, the method 100 may further include, in response to receiving the build input, building the source code. Steps 116 and 118 may be performed after outputting the notification of the at least one test method at step 110.

FIG. 9 shows additional steps of the method 100 related to modification of the source code. At step 120, the method 100 may further include receiving a modification to the source code at the editor window. The modification may be received via an input device. In some embodiments, the method 100 may further include, at step 122, determining that the modification to the source code removes the at least one test method from the source code. In such embodiments, the method 100 may further include outputting a test method removal notification for display on the display. Additionally or alternatively, the method 100 may further include, at step 126, determining that the modification to the source code adds at least one additional test method to the source code. In such embodiments, the method 100 may further include, at step 128, outputting a test method addition notification of the at least one additional test method for display on the display.

The systems and methods described overcome the disadvantage associated with prior test discovery systems that required source code to be compiled prior to test discovery, since they afford the developer a way to discover tests without requiring a build of the code, thereby saving time and making the end to end process of test discovery faster for the developer. Further, discovering test methods in source code can be accomplished by the system and methods above more quickly than discovering test methods in pre-built compiled assemblies using reflection, leading to additional performance benefits. This speed enhancement enables test methods to be discovered in real time as the developer is editing source code, leading to improvements in the development cycle. Finally, test discovery can be performed on a per-file basis, which can be useful to incrementally discover test methods on smaller units of source code, whereas prior methods required an entire assembly for test method discovery.

In some embodiments, the methods and processes described herein may be tied to a computing system of one or more computing devices. In particular, such methods and processes may be implemented as a computer-application program or service, an application-programming interface (API), a library, and/or other computer-program product.

Figure 10:
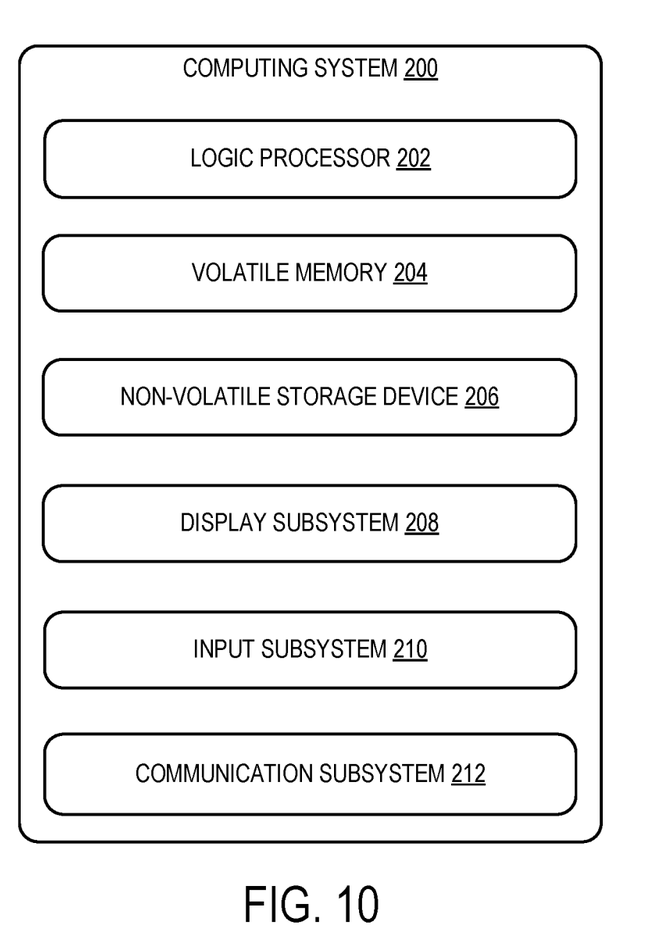
FIG. 10 shows a schematic representation of an example computing system, according to one embodiment of the present disclosure.

FIG. 10 schematically shows a non-limiting embodiment of a computing system 200 that can enact one or more of the methods and processes described above. Computing system 200 is shown in simplified form. Computing system 200 may, for example, embody the computing device 10 of FIG. 1, or may instead embody some other computing system. Computing system 200 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented/virtual reality devices.

Computing system 200 includes a logic processor 202, volatile memory 204, and a non-volatile storage device 206. Computing system 200 may optionally include a display subsystem 208, input subsystem 210, communication subsystem 212, and/or other components not shown in FIG. 10.

Logic processor 202 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 202 may include one or more physical processors (hardware) configured to execute software instructions. Additionally or alternatively, the logic processor 202 may include one or more hardware logic circuits or firmware devices configured to execute hardware-implemented logic or firmware instructions. Processors of the logic processor 202 may be single-core or multi-core, and the instructions executed thereon may be configured for sequential, parallel, and/or distributed processing. Individual components of the logic processor 202 optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects may be run on different physical logic processors of various different machines.

Volatile memory 204 may include physical devices that include random access memory. Volatile memory 204 is typically utilized by logic processor 202 to temporarily store information during processing of software instructions. It will be appreciated that volatile memory 204 typically does not continue to store instructions when power is cut to the volatile memory 204.

Non-volatile storage device 206 includes one or more physical devices configured to hold instructions executable by the logic processors to implement the methods and processes described herein. When such methods and processes are implemented, the state of non-volatile storage device 206 may be transformed—e.g., to hold different data.

Non-volatile storage device 206 may include physical devices that are removable and/or built-in. Non-volatile storage device 206 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 206 may include nonvolatile, dynamic, static, read/write, read-only, sequential-access, location-addressable, file-addressable, and/or content-addressable devices. It will be appreciated that non-volatile storage device 206 is configured to hold instructions even when power is cut to the non-volatile storage device 206.

Aspects of logic processor 202, volatile memory 204, and non-volatile storage device 206 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 200 implemented to perform a particular function. In some cases, a program may be instantiated via logic processor 202 executing instructions held by non-volatile storage device 206, using portions of volatile memory 204. It will be understood that different programs may be instantiated from the same application, service, code block, object, library, routine, API, function, etc. Likewise, the same program may be instantiated by different applications, services, code blocks, objects, routines, APIs, functions, etc. The term "program" encompasses individual or groups of executable files, data files, libraries, drivers, scripts, database records, etc.

When included, display subsystem 208 may be used to present a visual representation of data held by non-volatile storage device 206. As the herein described methods and processes change the data held by the non-volatile storage device 206, and thus transform the state of the non-volatile storage device 206, the state of display subsystem 208 may likewise be transformed to visually represent changes in the underlying data. Display subsystem 208 may include one or more display devices utilizing virtually any type of technology. Such display devices may be combined with logic processor 202, volatile memory 204, and/or non-volatile storage device 206 in a shared enclosure, or such display devices may be peripheral display devices.

When included, input subsystem 210 may comprise or interface with one or more user-input devices such as a keyboard, mouse, touch screen, or game controller. In some embodiments, the input subsystem 210 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection, gaze detection, and/or intent recognition; as well as electric-field sensing componentry for assessing brain activity; and/or any other suitable sensor.

When included, communication subsystem 212 may be configured to communicatively couple computing system 200 with one or more other computing devices. Communication subsystem 212 may include wired and/or wireless communication devices compatible with one or more different communication protocols. As non-limiting examples, the communication subsystem 212 may be configured for communication via a wireless telephone network, or a wired or wireless local- or wide-area network. In some embodiments, the communication subsystem 212 may allow computing system 200 to send and/or receive messages to and/or from other devices via a network such as the Internet.

According to one aspect of the present disclosure, a computing device is provided, including a display and a processor. The processor may be configured to execute a source code authoring application program. The processor may be further configured to output a graphical user interface (GUI) of the source code authoring application program for display on the display. The processor may be further configured to receive source code including one or more code instructions at an editor window included in the GUI. The editor window may be configured to provide real-time mark-up of the source code. At a compiler platform, the processor may be further configured to determine that the source code includes at least one test method based on at least one syntactic test method indicator or symbolic test method indicator included in the source code. The processor may be further configured to output a notification of the at least one test method for display on the display.

According to this aspect, the compiler platform may be included in the source code authoring application program.

According to this aspect, the GUI of the source code authoring application program may include a compiler platform window in which the notification of the at least one test method is displayed.

According to this aspect, the processor may be further configured to, at the compiler platform, determine that the at least one syntactic test method indicator or symbolic test method indicator is included in a test framework of a plurality of test frameworks. The processor may be further configured to output the notification of the at least one test method based at least in part on the test framework.

According to this aspect, the notification of the at least one test method may indicate at least one code instruction of the one or more code instructions at which the at least one test method occurs in the source code.

According to this aspect, the computing device may further include non-volatile memory. The processor may be further configured to maintain a test method store in the non-volatile memory, the test method store including respective test method metadata associated with the at least one test method.

According to this aspect, the processor may be further configured to receive a build input at the GUI. In response to receiving the build input, the processor may be further configured to build the source code.

According to this aspect, the notification is output prior to building the source code.

According to this aspect, the source code includes a plurality of source code files. The processor may be further configured to determine that a source code file of the plurality of source code files includes the at least one test method.

According to this aspect, the processor may be further configured to receive a modification to the source code at the editor window. The processor may be further configured to determine that the modification to the source code removes the at least one test method from the source code. The processor may be further configured to output a test method removal notification for display on the display.

According to this aspect, the processor may be further configured to receive a modification to the source code at the editor window. The processor may be further configured to determine that the modification to the source code adds at least one additional test method to the source code. The processor may be further configured to output a test method addition notification for display on the display.

According to another aspect of the present disclosure, a method for use with a computing device is provided. The method may include executing a source code authoring application program. The method may further include outputting a graphical user interface (GUI) of the source code authoring application program for display on a display. The method may further include receiving source code including one or more code instructions at an editor window included in the GUI. The editor window may be configured to provide real-time mark-up of the source code. The method may further include, at a compiler platform, determining that the source code includes at least one test method based on at least one syntactic test method indicator or symbolic test method indicator included in the source code. The method may further include outputting a notification of the at least one test method for display on the display.

According to this aspect, the compiler platform may be included in the source code authoring application program.

According to this aspect, the GUI of the source code authoring application program may include a compiler platform window in which the notification of the at least one test method is displayed.

According to this aspect, the method may further include, at the compiler platform, determining that the at least one syntactic test method indicator or symbolic test method indicator is included in a test framework of a plurality of test frameworks. The method may further include outputting the notification of the at least one test method based at least in part on the test framework.

According to this aspect, the method may further include receiving a build input at the GUI. The method may further include, in response to receiving the build input, building the source code. The notification may be output prior to building the source code.

According to this aspect, the method may further include determining that a source code file of a plurality of source code files included in the source code includes the at least one test method.

According to this aspect, the method may further include receiving a modification to the source code at the editor window. The method may further include determining that the modification to the source code removes the at least one test method from the source code. The method may further include outputting a test method removal notification for display on the display.

According to this aspect, the method may further include receiving a modification to the source code at the editor window. The method may further include determining that the modification to the source code adds at least one additional test method to the source code. The method may further include outputting a test method addition notification for display on the display.

According to another aspect of the present disclosure, a computing device is provided, including a display and a processor. The processor may be configured to execute a source code authoring application program. The processor may be further configured to output a graphical user interface (GUI) of the source code authoring application program for display on the display. The processor may be further configured to receive source code including one or more code instructions at an editor window included in the GUI. The editor window may be configured to provide real-time mark-up of the source code. At a compiler platform included in the source code authoring application program, the processor may be further configured to determine that the source code includes at least one test method based on at least one syntactic test method indicator or symbolic test method indicator included in the source code. The processor may be further configured to output a notification of the at least one test method for display on the display at a compiler platform window included in the GUI. The processor may be further configured to receive a build input at the GUI. In response to receiving the build input, the processor may be further configured to build the source code. The notification may be output prior to building the source code.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device, comprising:
   a processor; and
   a memory having instructions stored thereon including at least a source code authoring application program, the instructions executable by the processor to:
      execute the source code authoring application program;
      output a graphical user interface (GUI) of the source code authoring application program for display via a display device;
      receive source code including one or more code instructions at an editor window included in the GUI of the source code authoring application program, wherein the editor window is configured to provide real-time mark-up of the source code;
      at a compiler platform, determine that the source code includes at least one test method based on at least one syntactic test method indicator or symbolic test method indicator included in the source code;
      output a notification of the at least one test method in the source code for display via the display device;
      receive a build input at the GUI of the source code authoring application program; and
      in response to receiving the build input at the GUI of the source code authoring application program, build the source code, wherein the notification of the at least one test method in the source code is output prior to building the source code at the GUI of the source code authoring application program.

2. The computing device of claim 1, wherein the compiler platform is included in the source code authoring application program.

3. The computing device of claim 2, wherein the GUI of the source code authoring application program includes a compiler platform window in which the notification of the at least one test method in the source code is displayed.

4. The computing device of claim 1, wherein the instructions are further executable by the processor to:
   at the compiler platform, determine that the at least one syntactic test method indicator or symbolic test method indicator is included in a test framework of a plurality of test frameworks; and
   output the notification of the at least one test method in the source code based at least in part on the test framework of the plurality of test frameworks.

5. The computing device of claim 1, wherein the notification of the at least one test method in the source code indicates at least one code instruction of the one or more code instructions at which the at least one test method occurs in the source code.

6. The computing device of claim 1, further comprising a non-volatile memory, wherein the instructions are further executable by the processor to maintain a test method store in the non-volatile memory, the test method store includes respective test method metadata associated with the at least one test method in the source code.

7. The computing device of claim 1, wherein:
   the source code includes a plurality of source code files; and
   the instructions are further executable by the processor to determine that a source code file of the plurality of source code files includes the at least one test method in the source code.

8. The computing device of claim 1, wherein the instructions are further executable by the processor to:
   receive a modification to the source code at the editor window;
   determine that the modification to the source code at the editor window removes the at least one test method from the source code; and
   output a test method removal notification for display via the display device.

9. The computing device of claim 1, wherein the instructions are further executable by the processor to:
   receive a modification to the source code at the editor window;
   determine that the modification to the source code at the editor window adds at least one additional test method to the source code; and
   output a test method addition notification for display via the display device.

10. A method for use with a computing device, the method comprising:
    executing a source code authoring application program;
    outputting a graphical user interface (GUI) of the source code authoring application program for display via a display device;
    receiving source code including one or more code instructions at an editor window included in the GUI of the source code authoring application program, wherein the editor window is configured to provide real-time mark-up of the source code;
    at a compiler platform, determining that the source code includes at least one test method based on at least one syntactic test method indicator or symbolic test method indicator included in the source code;
    outputting a notification of the at least one test method in the source code for display via the display device;
    receiving a build input at the GUI of the source code authoring application program; and
    in response to receiving the build input at the GUI of the source code authoring application program, building the source code, wherein the notification of the at least one test method in the source code is output prior to building the source code at the GUI of the source code authoring application program.

11. The method of claim 10, wherein the compiler platform is included in the source code authoring application program.

12. The method of claim 11, wherein the GUI of the source code authoring application program includes a compiler platform window in which the notification of the at least one test method in the source code is displayed.

13. The method of claim 10, further comprising:
    at the compiler platform, determining that the at least one syntactic test method indicator or symbolic test method indicator is included in a test framework of a plurality of test frameworks; and
    outputting the notification of the at least one test method in the source code based at least in part on the test framework of the plurality of test frameworks.

14. The method of claim 10, further comprising determining that a source code file of a plurality of source code files included in the source code includes the at least one test method in the source code.

15. The method of claim 10, further comprising:
receiving a modification to the source code at the editor window;
determining that the modification to the source code at the editor window removes the at least one test method from the source code; and
outputting a test method removal notification for display via the display device.

16. The method of claim 10, further comprising:
receiving a modification to the source code at the editor window;
determining that the modification to the source code at the editor window adds at least one additional test method to the source code; and
outputting a test method addition notification for display via the display device.

17. A computing device, comprising:
a display; and
a processor configured to:
 execute a source code authoring application program;
 output a graphical user interface (GUI) of the source code authoring application program for display via the display device;
 receive source code including one or more code instructions at an editor window included in the GUI of the source code authoring application program, wherein the editor window is configured to provide real-time mark-up of the source code;
 at a compiler platform included in the source code authoring application program, determine that the source code includes at least one test method based on at least one syntactic test method indicator or symbolic test method indicator included in the source code;
 output a notification of the at least one test method in the source code for display via the display device at a compiler platform window included in the GUI of the source code authoring application program;
 receive a build input at the GUI of the source code authoring application program; and
 in response to receiving the build input at the GUI of the source code authoring application program, build the source code, wherein the notification of the at least one test method in the source code is output prior to building the source code at the GUI of the source code authoring application program.

18. The computing device of claim 17, wherein the processor is further configured to:
 output the notification of the at least one test method in the source code based at least in part on a test framework of a plurality of test frameworks.

19. The computing device of claim 17, wherein the notification of the at least one test method in the source code indicates at least one code instruction of the one or more code instructions at which the at least one test method occurs in the source code.

20. The computing device of claim 17, further comprising a non-volatile memory, wherein the processor is further configured to maintain a test method store in the non-volatile memory, and wherein the test method store includes respective test method metadata associated with the at least one test method in the source code.

* * * * *